June 25, 1968 P. W. ZWEEGERS 3,389,540
DEVICE FOR THE LATERAL SUSPENSION OF A MOWING BAR OR
THE LIKE FROM A TRACTOR
Filed July 6, 1965 8 Sheets-Sheet 1
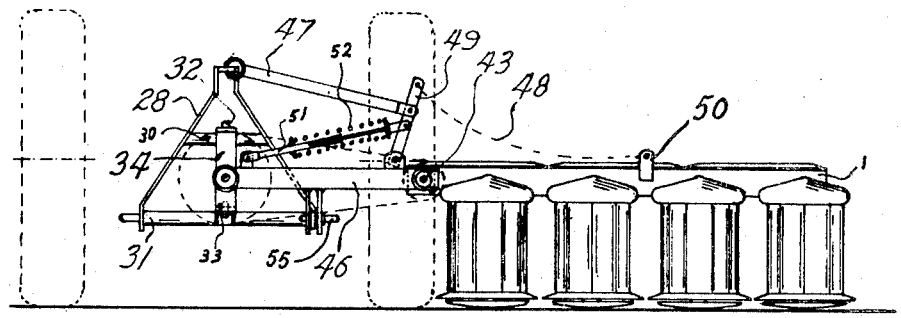
Fig 1
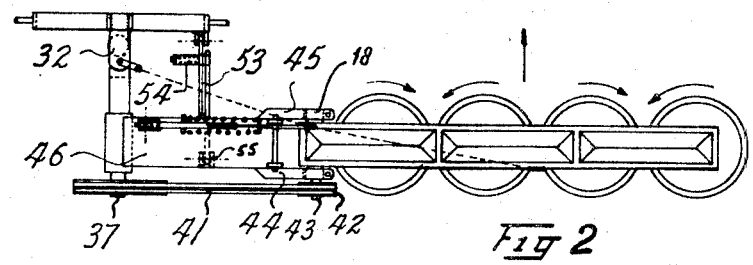
Fig 2
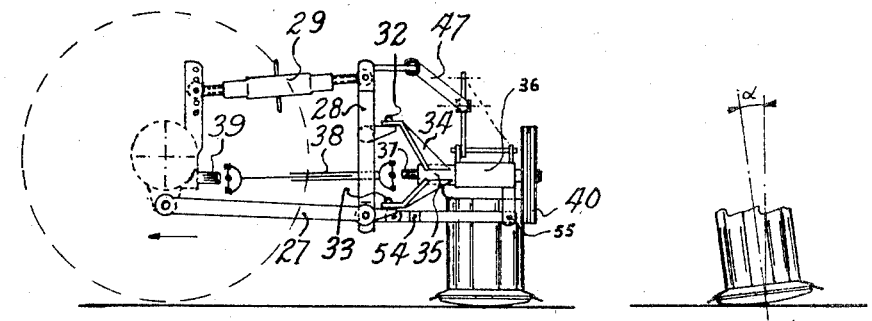
Fig 3
Fig 4
INVENTOR:
PETRUS W. ZWEEGERS
BY
Breitenfeld & Levine
ATTORNEYS

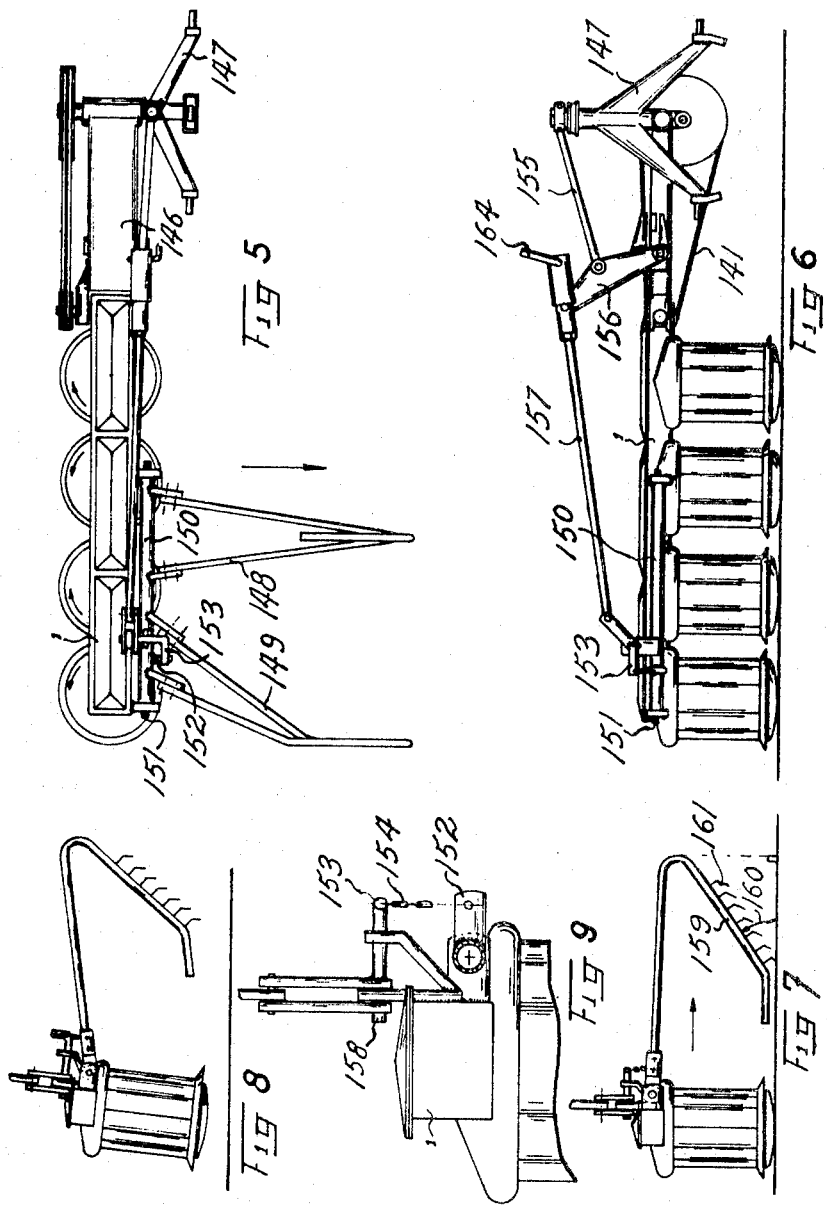

June 25, 1968   P. W. ZWEEGERS   3,389,540
DEVICE FOR THE LATERAL SUSPENSION OF A MOWING BAR OR
THE LIKE FROM A TRACTOR
Filed July 6, 1965   8 Sheets-Sheet 4
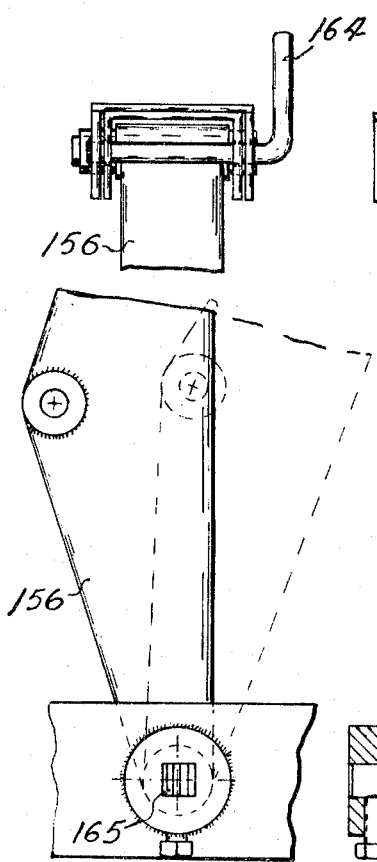
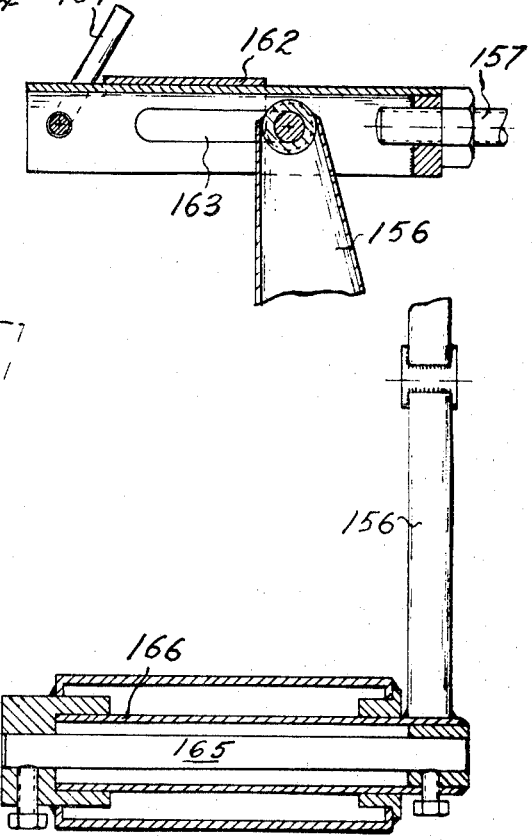
INVENTOR:
PETRUS W. ZWEEGERS
BY
Braitenfeld & Levine
ATTORNEYS

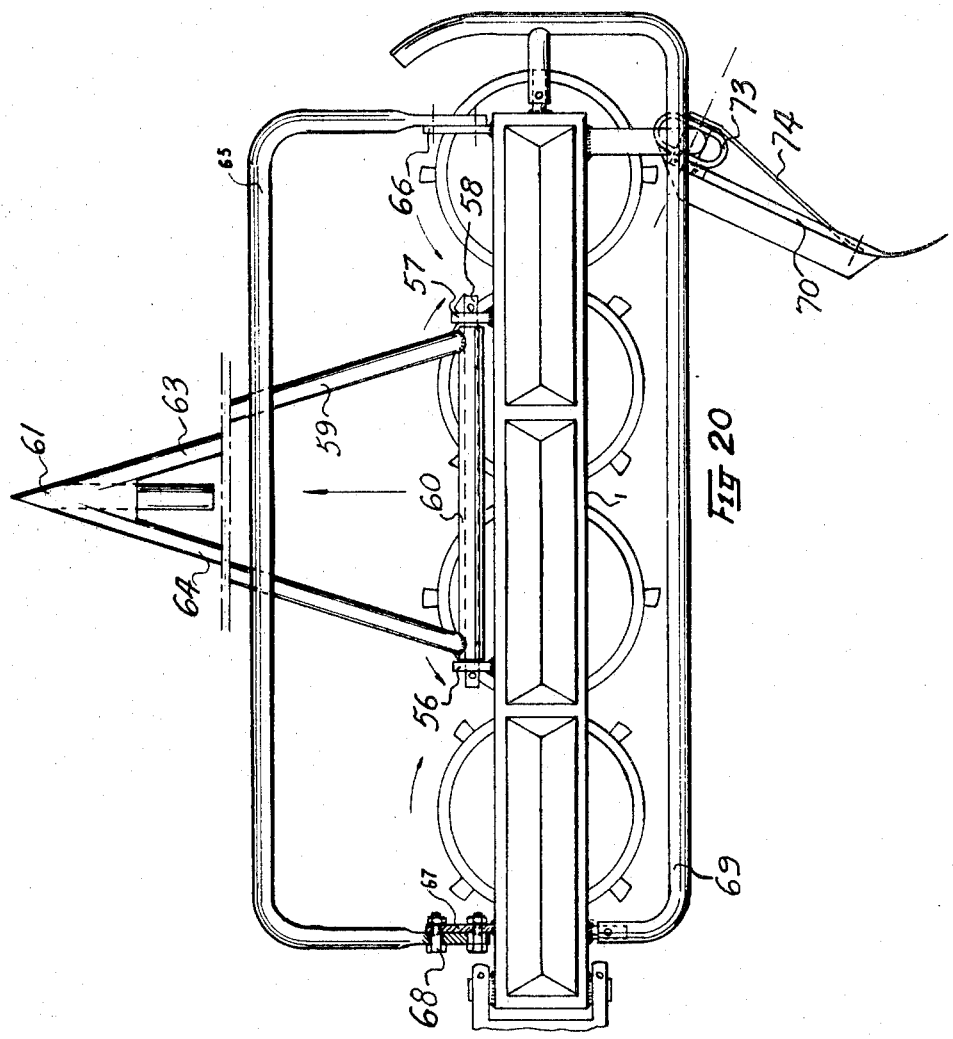

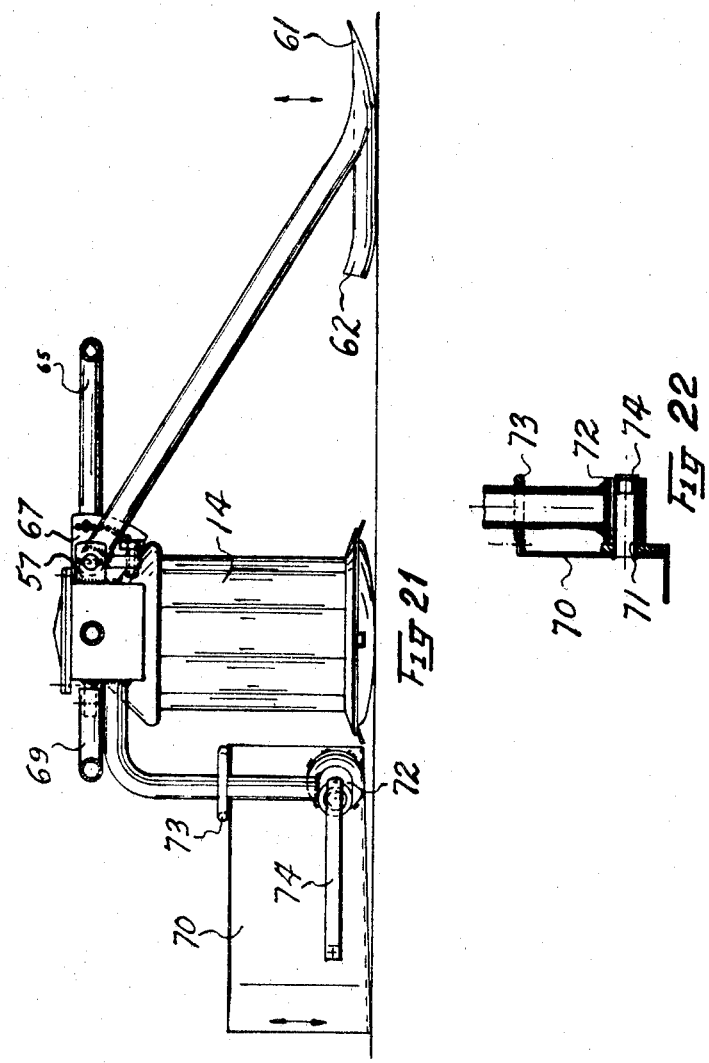

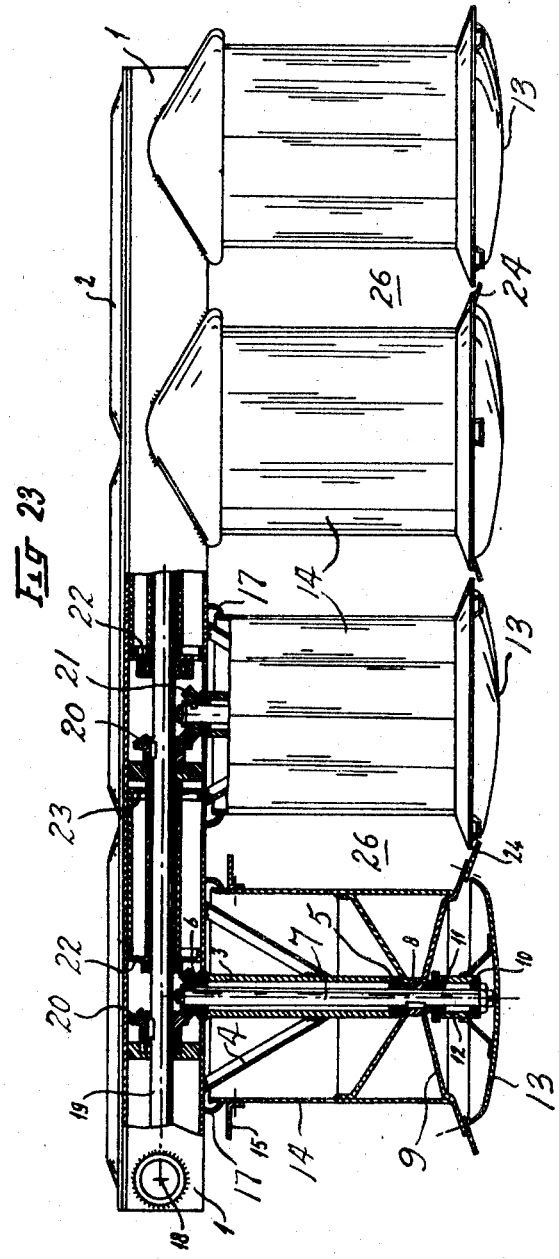

> United States Patent Office 3,389,540
Patented June 25, 1968

3,389,540
DEVICE FOR THE LATERAL SUSPENSION OF A MOWING BAR OR THE LIKE FROM A TRACTOR
Petrus Wilhelmus Zweegers, Eindhovenscheweg 2, Geldrop, Netherlands
Filed July 6, 1965, Ser. No. 469,392
Claims priority, application Netherlands, July 11, 1964, 6407939; Oct. 9, 1964, 6411816; Feb. 19, 1965, 6502084
11 Claims. (Cl. 56—25.4)

ABSTRACT OF THE DISCLOSURE

Triangular subframe pivotally attachable to three point linkage of a tractor. Intermediate beam pivoted at one end to subframe on axis parallel to longitudinal axis of tractor, and at other end to mowing beam carrying mowers. Normally slack linkage between subframe and mowing beam becomes taut as subframe is lifted, thus elevating mowing beam.

---

Figure 10:
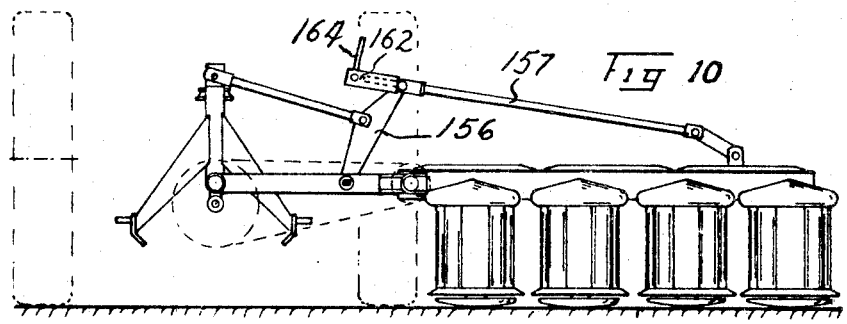

This invention relates to an apparatus for laterally suspending a mowing beam or like implement from a tractor, comprising a subframe, which may be triangular in shape, pivoted to the three point linkage of the tractor and carrying a bracket for the mowing beam or the like.

In a known apparatus, the bracket is merely a bearing sleeve which is fixed in transverse direction to the subframe and in which one merely inserts a journal of the mowing beam or the like. In this known apparatus, there are only limited possibilities for adjustment and adaptation of the mowing beam with respect to the field.

It is the object of the invention to provide greater adjustment and adaptation possibilities for the mowing beam. According to the invention, this object is achieved by virtue of the connection of the mowing beam or the like with the subframe comprising a substantially horizontal intermediate beam which is pivoted to the bracket and to the mowing beam, and a linkage between an intermediate point of the mowing beam and the upper portion of the subframe, said linkage being normally slack but becoming taut by lifting of the three point linkage of the tractor, both the intermediate beam and the connecting linkage being substantially positioned in a plane normal to the longitudinal axis of the tractor.

Preferably, the mowing beam is adjustable as to the position of the axis of the mowing devices in a vertical plane parallel to the direction of movement of the machine.

Preferably, the connecting linkage comprises a link pivoted to the subframe, a chain or like tension element such as a series of interconnected links, said chain or the like being connected to an intermediate point of the mowing beam, and an upwardly directed lever pivoted to the intermediate beam, the adjacent ends of the first mentioned link and of the chain or the like being pivoted to said lever.

For balancing the weight of the intermediate beam, the connection comprises preferably a compensating spring, which may be arranged between the lever and the intermediate beam.

So as to reduce the width of the tractor-implement-combination substantially to the width of the tractor during road transport, the mowing beam may have a pivoting connection about a vertical axis close to its pivot connection with the intermediate beam, so that the mowing beam may be pivoted rearwards for extending longitudinally of the tractor, or it may be pivoted over about 180° so as to extend in transverse direction behind the tractor.

Damage to the cutters may be prevented by connecting the mowing beam and the intermediate beam at a point spaced from their vertical pivot connection moreover by a snap mechanism which is, e.g., loaded by a spring so that it is released for rearward pivoting of the mowing beam when the latter hits a heavy obstacle.

For mowing, e.g., downwardly inclined shoulders, the connection of the link or the chain with the lever may comprise an oblong pivot hole which is for the greater part closed by a latch, said latch being removable so that the pivot may move to the other end of the hole to lengthen the connection.

The invention is now further elucidated by reference to the accompanying drawings.

Figure 11:
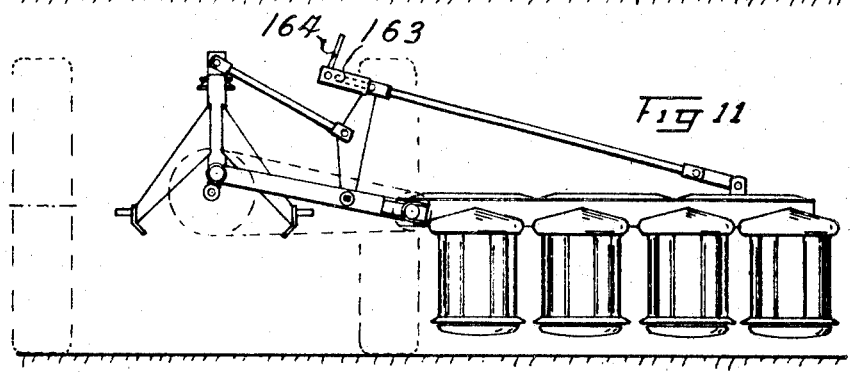
Figure 12:
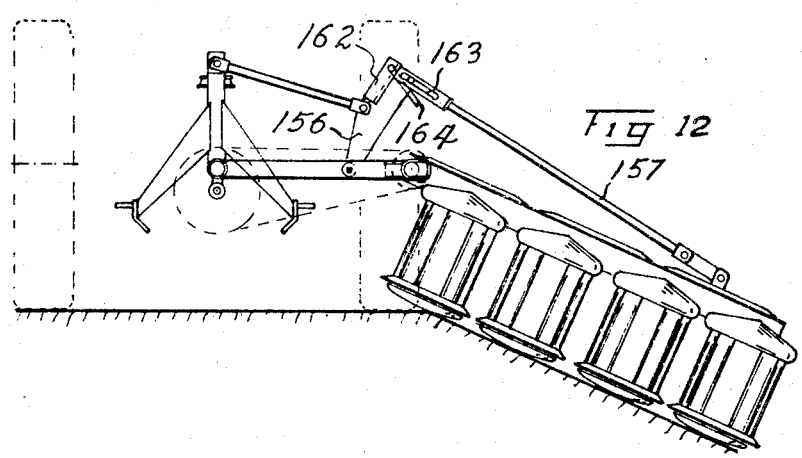
Figure 18:
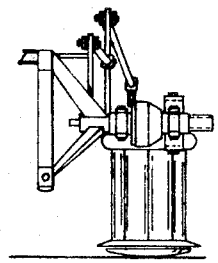
Figure 17:
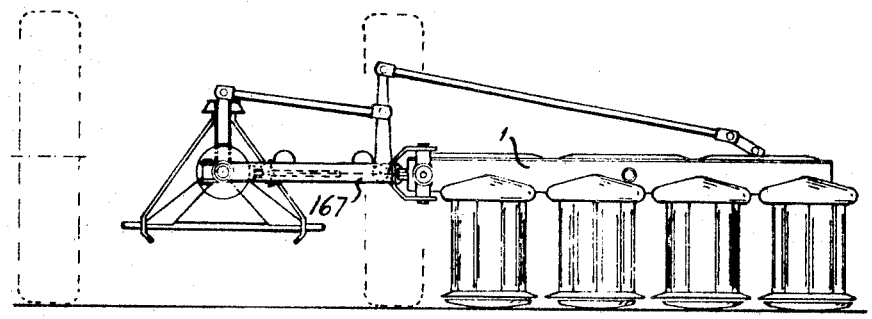
Figure 19:
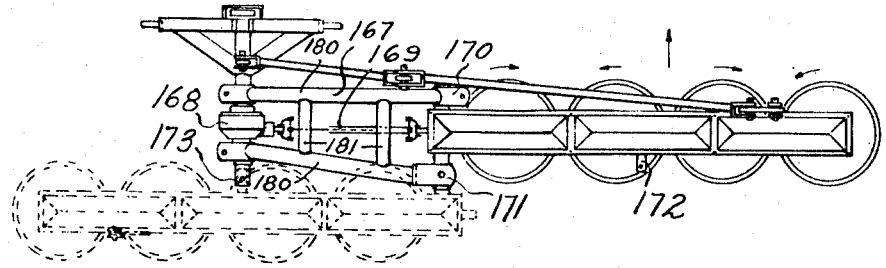

FIG. 1 is a rear view of one embodiment of the invention.
FIG. 2 is a plan view of the apparatus according to FIG. 1.
FIG. 3 is a lateral view of the apparatus according to FIG. 1.
FIG. 4 is a diagrammatic view of a forwardly inclined apparatus.
FIG. 5 is a plan view of a second embodiment.
FIG. 6 is a rear view of the apparatus according to FIG. 5.
FIG. 7 is a lateral view of the apparatus according to FIG. 5.
FIG. 8 is a corresponding view of the lifted position of the apparatus.
FIG. 9 shows some details of the apparatus according to FIG. 5.
FIG. 10 is a rear elevation of the apparatus of FIG. 5 showing the mowers in cutting position.
FIG. 11 is a view similar to FIG. 10 showing the mowers in raised positon.
FIG. 12 is a view similar to FIG. 10 showing the mowers in a different position.
FIG. 13 is a side view of the latch.
FIG. 14 is a rear view of the latch.
FIG. 15 is a rear view of the connections.
FIG. 16 is a side view of the connections.
FIG. 17 is a rear view of a third embodiment.
FIG. 18 is a plan view of FIG. 17.
FIG. 19 is a side view of FIG. 17.
FIG. 20 is a plan view of a mowing beam with auxiliary devices.
FIG. 21 is a lateral view of the apparatus according to FIG. 20.
FIG. 22 shows a detail of the guide plate mounting.
FIG. 23 shows a mowing beam partly in section.

In FIGS. 1, 2 and 3, parts of a tractor are indicated in phantom lines whereas the usual lower pair of lifting links 27 and the upper adjustable link 29 of the three point linkage are shown in full lines.

A triangular subframe 28 is pivoted to the three point linkage so that it may be moved up and down in a substantially vertical plane by means of the links 27. Two cross bars 30 and 31 are welded to the subframe 28 and they carry a vertical journal 32 and 33 respectively on rearwardly directed braces. A bracket 34 is mounted on the journals 32 and 33 for pivoting movement about a vertical axis. The bracket 34 carries a horizontal bearing 35 the axis of which is parallel to the longitudinal axis of the tractor in the central position of the bracket. A main drive shaft 37 is journaled in the bearing 35 and it is coupled with the tractor power take off 39 via an intermediate shaft 38 which comprises a telescoping portion and a pair of universal joints so as to permit movements of the bracket 34 in all directions with respect to the tractor. A sleeve 36 is rotatably mounted on the outer circumference of the bearing 35 and said sleeve is welded to one end of an intermediate beam 46. The intermediate beam 46 is substantially horizontally directed to the right of the bearing 35 and sleeve 36 and the right end of the beam carries two forks 44 and 45 clamped on a horizontal journal 18 so as to hold this journal normally parallel to the longitudinal axis of the tractor.

The left end of a mowing beam 1 is mounted on said journal 18 for pivotal movement in a vertical plane. In normal position, the mowing beam 1 extends about in line with the intermediate beam 46 and it is supported on the ground via four mowing devices which are spaced over the length of the mowing beam.

The mowing devices are driven via an intermediate shaft 43 journaled concentrically in the journal 18, the rear end of the shaft 43 carrying a pulley 42. The rear end of the main shaft 37 also carries a pulley 40, and a set of V-belts 41 is mounted around the pulleys 40 and 42. Since both shafts 43 and 37 are concentric with the pivots of the intermediate beam 46, the belt tension does not change with movements of the beam 46.

The shaft 43 drives a shaft 19 positioned in the box-shaped mowing beam 1, via a set of bevel gears, whereas the shaft 19 drives the individual mowing devices 9 via further sets of bevel gears, see FIG. 23. Preferably, the mowing beam 1 is provided with partitions on both sides of each set of bevel gears, so as to divide the interior space of the beam into separate chambers. Only the chambers containing a set of gears need be filled with lubricant. This construction has the advantage that the lubricant will not flow to one end of the mowing beam when mowing in an inclined position of the beam but the lubricant remains in the chambers in which the bevel gears are arranged. The eyeshaped left end of a link 47 engages with a lug mounted on the upper end of the subframe 28 and the right end of the link 47 is pivotally connected with an intermediate point of a lever 49. The lower end of the lever 49 is pivotally connected with the intermediate beam 46, adjacent the forks 44 and 45, such that the lever 49 can rock in a vertical plane transverse to the longitudinal axis of the tractor. A chain 48, a cable or a similar tension element such as a series of pivotally interconnected links, is connected between the upper end of the lever 49 and a lug 50 welded on an intermediate part of the mowing beam 1, such that this connection is slack in the usual operating position of the apparatus and will not prevent movements of the mowing beam for adapting itself to the shape of an uneven field. By lifting the links 27, only the subframe 28 initially moves upwards, but after the chain 48 has become taut, the whole apparatus, namely the subframe 28, the intermediate beam 46 and the mowing beam 1 are then lifted as a unit, the mowing beam 1 remaining horizontal.

The apparatus so far described is very suitable for a mowing beam of which the juxtaposed rotary mowing devices each rest on the ground via a saucer-shaped support member 13 (FIG. 23) mounted under each cutting disk. In such an apparatus, the supporting collars 9 of the mowing devices are held automatically at the accurate cutting height, since the supporting member 13 sets the cutting height for each supporting collar and the mowing beam can freely follow the up and down movements of the several cutting devices under the influence of a rough field, without hindrance by its suspension. However, it is also possible to use the described suspension for mowing beams which roll on wheels, or for other implements which should be able to adapt themselves to the shape of a rough field. The cutting height of the mowing devices can be changed by changing the length of the upper link 29 of the three point linkage. It is shown in FIG. 4 that the mowing beam can be tilted so that the cutting disk axes are downwardly and rearwardly inclined by shortening the link 29. Thus, the front portion of the circumference of the cutting disks comes nearer to the ground and the cutting height is decreased.

As the mowing beam is loaded by the weight of its suspension at its end adjacent to the tractor, it is desirable to balance the weight of the suspension so as to obtain an even distribution of the pressure on the ground over the length of the mowing beam. In the described embodiment, a compensating spring 52 for balancing the weight is mounted about a telescoping link 51, pivoted between the lever 49 and a point of the intermediate beam 36 adjacent its inner end.

A further link 53 extends in the longitudinal direction of the tractor, from the subframe 28 to the intermediate beam 46 to prevent rearward pivoting of the apparatus about the journal 32–33 during the normal operation. When the combination of tractor and mowing machine is moved over the road, the pin 55 is removed from the rear pivot point of the link 53 so that the mowing beam can be turned rearwardly 90° to extend longitudinally of the tractor.

The link 53 comprises a snap action connection 54 which is released when the pressure thereon increases above a predetermined value, e.g., upon the mowing beam hitting a heavy obstacle, so that the mowing beam will be released to pivot rearwards and damage to the cutters will be prevented.

In the embodiment according to FIGURES 5–12, the mowing beam 1 is also provided with four rotary mowing devices spaced over its length and the mowing beam 1 is also pivoted to an intermediate beam 146, substantially as described in connection with FIGS. 1 to 4. The intermediate beam 146 is also pivoted at its other end to a subframe 147 and the latter is also connected to the three point linkage of a tractor, thus substantially as described in connection with FIGS. 1 to 4. In this embodiment, the subframe 147 is composed of hollow beams. The mowing beam comprises two forwardly directed plant separators 148 and 149 which are substantially V-shaped, whereas their free end curves downward and rearward. The separators 148 and 149 are welded to a tube 150 which is rotatably mounted longitudinally of the mowing beam 1 on a shaft 151. A lip 152 is welded to the tube 150 to project in the same general direction as the separators and the lip is connected, via a chain 154, to a lever 153 welded to the outer part of the linkage between mowing beam and subframe so as to extend forwards. In this case, the linkage comprises a link 155 pivoted to the subframe 147, a lever 156 pivoted to the intermediate beam and a series of pivotally interconnected links 157 extending between the outer end of the lever 156 and a relatively outer point of the mowing beam. The link 155 extends between an intermediate point of the lever 156 and the subframe 147.

When lifting the device by means of the three point linkage, only the subframe 147 is initially moved upwards, thereby tensioning the connection 155–156–157 and the chain 154. The lever 153 has two arms (FIGS. 5 and 6) the arm connected to the link 157 normally being arranged at an obtuse angle to that link, but the arm and link becoming aligned as the subframe 147 moves up. The other arm of the lever 153 is connected to the chain 154 (FIG. 9). The length of the chain 154 is so chosen that upon continuation of the lifting movement the lever 153 rocks about its pivot and, the separators 148 and 149 are lifted before the connection 155–156–157 is taut, thus before the mowing beam 1 is lifted which prevents the separators from digging into the ground.

In this embodiment, the outer end 159 of the separators is downwardly curved at a sharp angle 160 (FIG. 7) directed away from the intended direction of movement so that the separators will not get caught by bushes, etc. The portion 159 of the separators guides the plants to the cutting disks and to increase their combing action on certain crops, they may be provided with a series of wire pins 161, preferably made of spring steel.

In this embodiment, the pivot connection of the link 157 with the lever 156 comprises an oblong hole 163 (see also FIGS. 13 and 14) for receiving the pivot pin which connects the link 157 and lever 156. Normally the pivot pin is held at one end of the oblong hole 163, a latch closing the remainder of said hole. The latch 162 is provided with a handle 164 within the reach of the tractor driver who can remove the latch from the hole 163 by rotation about its pivotal connection to the link.

FIGURES 10 to 12 show the different positions which the apparatus may assume. FIG. 10 shows the usual operating position in which the latch 162 closes the hole 163, whereas the linkage between the mowing beam and the subframe is not tensioned. In this position, the mowing beam 1 is supported on the ground via the mowing devices and it can adapt itself to the shape of the field, within the limits set be the slackness in the connecting linkage. By lifting the subframe, the apparatus will assume the position according to FIGURE 11 in which the mowing beam 1 is held horizontally at a certain spacing over the ground. After releasing the latch 162 when the apparatus is in the position according to FIG. 10, it will assume the position of FIG. 12, e.g., for mowing a downwardly inclined shoulder of a road. Of course, when the apparatus is in the position of FIG. 12 and it should be lifted to the position according to FIG. 11, it should first be driven onto horizontal ground and the latch should be re-engaged, since when lifting immediately from the position of FIG. 12, the mowing beam remains in the inclined position and may not be cleared of the ground.

The weight of the suspension is balanced in this embodiment by a torsion bar 165 mounted in the lower pivot of the lever 156, see FIGS. 10 and 16.

In the embodiment according to FIGS. 17–19, the intermediate beam 167 is composed of tubes, namely two longitudinal tubes 180 and two interconnecting transverse tubes 181. A drive shaft 169 is situated between the two longitudinal tubes of the intermediate beam 167 and said drive shaft is provided with a telescoping portion and a set of universal joints, whereas its one end is coupled to the main shaft in the mowing beam 1 and its other end is coupled to a gear case 168 the input end of which is connected to the tractor power take-off via an intermediate shaft journaled in the subframe.

A further distinguishing feature of this embodiment is that the mowing beam 1 can be pivoted over 180° in the horizontal plane for road transport. The connection of the mowing beam 1 with the intermediate beam 167 has a fixed pivot 171 at the rear fork of the intermediate beam 167, and a forward connecting part 170 which can be released by removing a pin. After pivoting the mowing beam 1 over 180° about the fixed pivot 171, it will be situated transversely behind the tractor and as shown in the drawing it does not protrude a substantial amount over the lateral width of the tractor. This position of the mowing beam can be fixed by inserting a pin in an eye 172 of the mowing beam 1 and in an eye 173 fixed at the inner end of the intermediate beam 167.

In the embodiment according to FIGS. 20 and 21, the plant separator 59 is again welded to a tube 60 which can rock about a shaft journaled in longitudinal direction on the mowing beam. Both legs 63 and 64 of the separator 59 end in a forwardly directed tip 61, whereas a sledge-like tubular piece 62 protrudes from said tip 61 in a rearward direction. The shaft 58 of the separator is mounted in two brackets 56 and 57 welded to the mowing beam 1.

In front of the mowing beam 1, there is a guard rail 65 which not only forms a protection for the operator but which also assists in positioning very high plants in the correct position before the cutting means.

The height of the guard rail 65 can be adjusted in that its ends are provided with a plate 66 or 67 respectively and said plates are provided with a series of holes so as to insert the fastening screws 78 in that hole which produces the desired position. The rail 65 forces the plants into a somewhat inclined position which is favorable for the cutting operation and which also furthers their transport through the slot between two drums 14 to the rear side of the machine. Behind the mowing beam 1, there is also a guard rail 69 whereas the outer end of the mowing beam is further provided with a guide plate 70 which guides the mowed crop toward the tractor so as to keep a strip of ground parallel to the direction of movement and behind the guide plate 70 free from plants. Thus, the two right wheels of the tractor can roll over the free strip of ground at the next pass of the tractor so that those wheels do not push any plants into the ground. The guide plate 70 many adapt itself to possible bumps of the field since it can rock about a pin 71 (see FIG. 22) which is held in a bearing 72 with ample clearance. The rocking movements of the guide plate are limited by an oblong eye 73, whereas a blade spring 74 biases the guide plate 70 at such a pretension that it will make its adjusting movements gradually and without rattling.

In all embodiments, the mowing beam can be pivoted about its journal 18 to an upwardly inclined or even vertically upward position for mowing in this position.

Obviously, several variants are possible within the scope of the invention. The mowing beam may, e.g., be provided with wheels for supporting the mowing beams so that the cutting devices are held at a predetermined distance over the ground, and these wheels may be retractable or adjustable in height.

What I claim is:

1. Apparatus for laterally suspending a mowing beam or like implement from the three point lift linkage of a tractor, the mowing beam carrying a series of rotary mowing devices, comprising a subframe which is pivoted to the three point linkage of the tractor and which carries a bracket for the mowing beam or the like, characterized in that the connection of the mowing beam or the like with the subframe comprises a substantially horizontal intermediate beam which is pivoted to the bracket and to the mowing beam, and a linkage between an intermediate point of the mowing beam and the upper portion of the subframe, said linkage being normally slack but becoming taut by lifting of the three point linkage of the tractor, both the intermediate beam and the connecting linkage being substantially positioned in a plane normal to the longitudinal axis of the tractor, whereby by lifting the three point linkage of the tractor the entire mowing beam is lifted while remaining substantially horizontal.

2. Apparatus according to claim 1, characterized in that the connecting linkage comprises a first link pivoted to the subframe, and a further linkage members such as a tensionable element, and further an upwardly directed lever, the lower end of which is pivoted to the intermediate beam whereas the adjacent ends of the first link and the further linkage member are connected to higher points of said lever.

3. Apparatus according to claim 2, characterized in that the further linkage member is a chain or cable and is connected to the lever at a higher point than the connection between the first link and the lever.

4. Apparatus according to claim 2, characterized in that a spring for compensating the weight of the suspension device is arranged between the lever and a point of the intermediate beam close to the longitudinal axis of the tractor.

5. Apparatus according to claim 2, characterized in that a spring such as a torsion bar is mounted in the connection of the lever with the intermediate beam.

6. Apparatus according to claim 1, characterized in that intermediate shafts for driving the mowing devices, e.g., via pulleys mounted on those shafts, are concentrically journalled in the pivots at both ends of the intermediate beam.

7. Apparatus according to claim 1, characterized in that the mowing beam can be pivoted rearward with respect to the tractor about a vertical axis situated close to the connection between the mowing beam and the intermediate beam, such that the mowing beam will be situated longitudinally of the tractor, e.g., for road transport.

8. Apparatus according to claim 1, characterized in that the mowing beam can be rearwardly pivoted over about 180° with respect to the tractor about a vertical axis situated close to the connection of the mowing beam with the intermediate beam, such that the mowing beam extends transversely behind the tractor during road transport and does not protrude a substantial amount laterally of the tractor.

9. Apparatus according to claim 7, characterized in that adjacent to the vertical pivot axis of the mowing beam, there is a further connection between the subframe and the intermediate beam, said further connection comprising a snap mechanism which is biased, e.g., by a spring so that it releases for rearward pivoting of the mowing beam when the latter hits a heavy obstacle.

10. Apparatus according to claim 2, characterized in that an oblong pivot hole is provided in the connection of the first link or the further linkage member with the lever, said oblong hole normally being closed for the greater part by a latch which holds the pivot at one end of the pivot hole, said latch being retractable for releasing the pivot to move to the other end of the pivot hole so that the length of the linkage will be increased.

11. Apparatus according to claim 10, characterized in that the latch is pivoted to the link close to the connection of the latter to the lever, and the latch is provided with a handle within the reach of the tractor driver for being rocked into and out of its latching position.

References Cited
UNITED STATES PATENTS

| | | | |
|---|---|---|---|
| 2,637,966 | 5/1953 | Richey | 56—25 |
| 2,673,437 | 3/1954 | Pollock et al. | 56—25 |
| 2,791,081 | 5/1957 | Allen et al. | 56—25.4 |
| 3,053,033 | 9/1962 | Maguire | 56—25.4 |
| 3,103,090 | 9/1963 | Campbell | 56—6 |

RUSSELL R. KINSEY, *Primary Examiner.*